US008150333B2

(12) United States Patent
Lin et al.

(10) Patent No.: US 8,150,333 B2
(45) Date of Patent: Apr. 3, 2012

(54) MULTIBAND ANTENNA AND WIRELESS COMMUNICATION DEVICE EMPLOYING THE SAME

(75) Inventors: Te-Chang Lin, Tu-Cheng (TW); Cho-Kang Hsu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 317 days.

(21) Appl. No.: 12/627,048

(22) Filed: Nov. 30, 2009

(65) Prior Publication Data

US 2010/0330936 A1 Dec. 30, 2010

(30) Foreign Application Priority Data

Jun. 25, 2009 (CN) .......................... 2009 1 0303672

(51) Int. Cl.
*H04B 1/44* (2006.01)

(52) U.S. Cl. ........... 455/78; 455/90.1; 455/101; 455/93; 455/277.1; 455/575.7

(58) Field of Classification Search .................... 455/78, 455/90.1, 101, 93, 277.1, 575.7, 129
See application file for complete search history.

(56) References Cited

U.S. PATENT DOCUMENTS

| | | | | |
|---|---|---|---|---|
| 6,021,317 | A * | 2/2000 | Irvin | 455/78 |
| 7,251,499 | B2 * | 7/2007 | Ella et al. | 455/552.1 |
| 2010/0073243 | A1 * | 3/2010 | Ayala Vazquez et al. | 343/702 |

* cited by examiner

*Primary Examiner* — Sanh Phu
(74) *Attorney, Agent, or Firm* — Altis Law Group, Inc.

(57) ABSTRACT

An exemplary multiband antenna includes an antenna module and a switch module electrically connected to the antenna module. The antenna module includes a first antenna member, a second antenna member, and a third antenna member, which are mounted on a main board. The antenna module is electrically connected or disconnected by operating the switch module to form different antenna structures for receiving different wireless signals.

18 Claims, 2 Drawing Sheets

MULTIBAND ANTENNA AND WIRELESS COMMUNICATION DEVICE EMPLOYING THE SAME

BACKGROUND

1. Technical Field

The disclosure generally relates to antennas for wireless communication devices, particularly, to a multiband antenna for communicating wireless signal and a wireless communication device employing the multiband antenna.

2. Description of the Related Art

Some of the wireless communication devices, such as mobile phones, personal digital assistants (PDAs), have antennas for receiving/sending wireless signals such as frequency modulation (FM) signals, digital video broadcasting (DVB) signals.

At present, to receive/send FM broadcast signals, the wireless communication devices usually uses an inconvenient external earphone as an FM antenna. Furthermore, to receive DVB signals, the wireless communication devices also need to be equipped with an additional DVB antenna. However, many antennas have complicated structures and are large in size, making it difficult to reduce the cost and miniaturize the wireless communication devices.

Therefore, there is room for improvement within the art.

BRIEF DESCRIPTION OF THE DRAWINGS

Many aspects of a multiband antenna and a wireless communication device employing the same can be better understood with reference to the following drawings. The components in the drawings are not necessarily drawn to scale, the emphasis instead being placed upon clearly illustrating the principles of the exemplary multiband antenna and the wireless communication device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
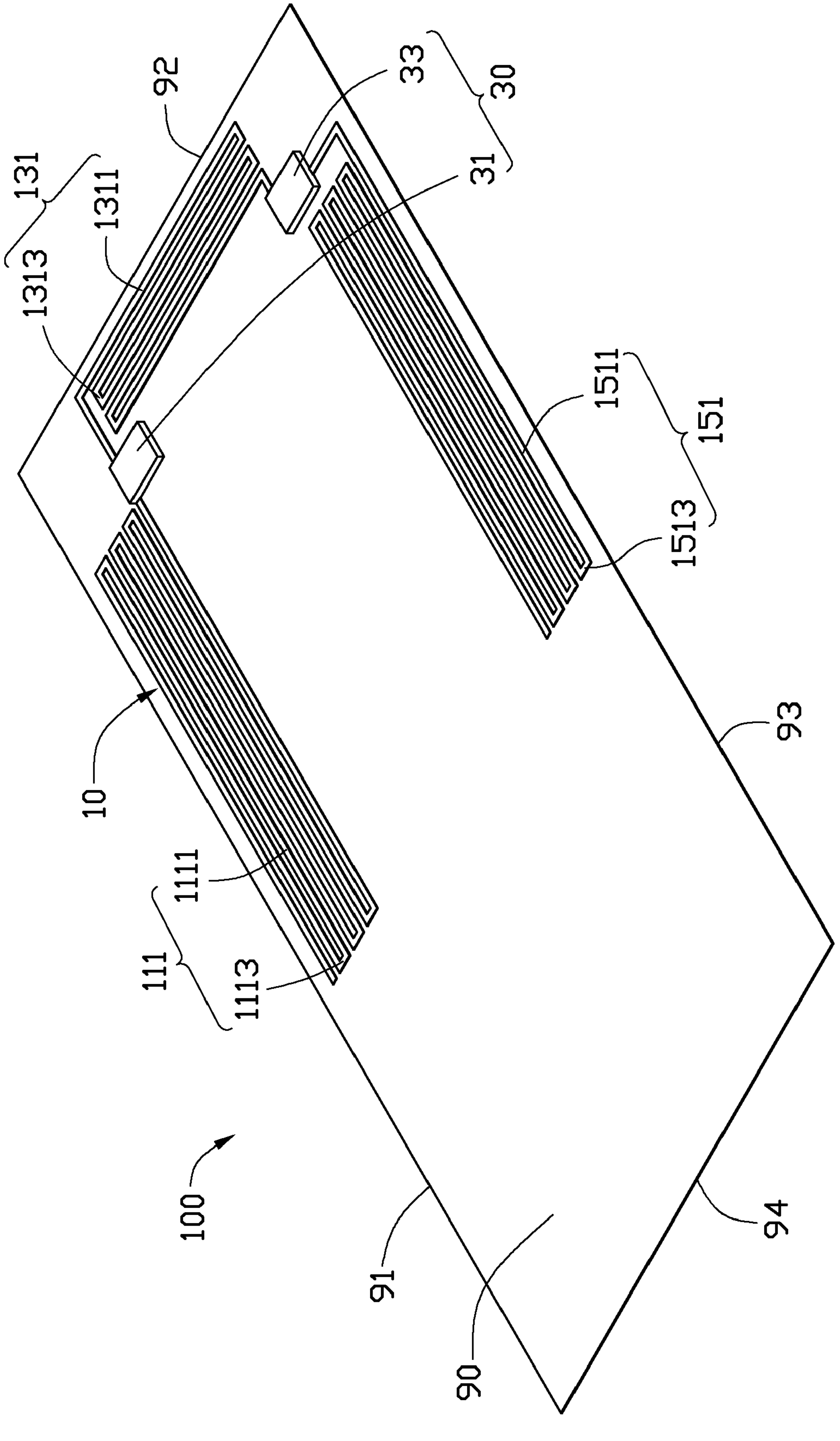
FIG. 1 is a schematic view of a multiband antenna mounted on a main board, according to an exemplary embodiment.
Figure 2:
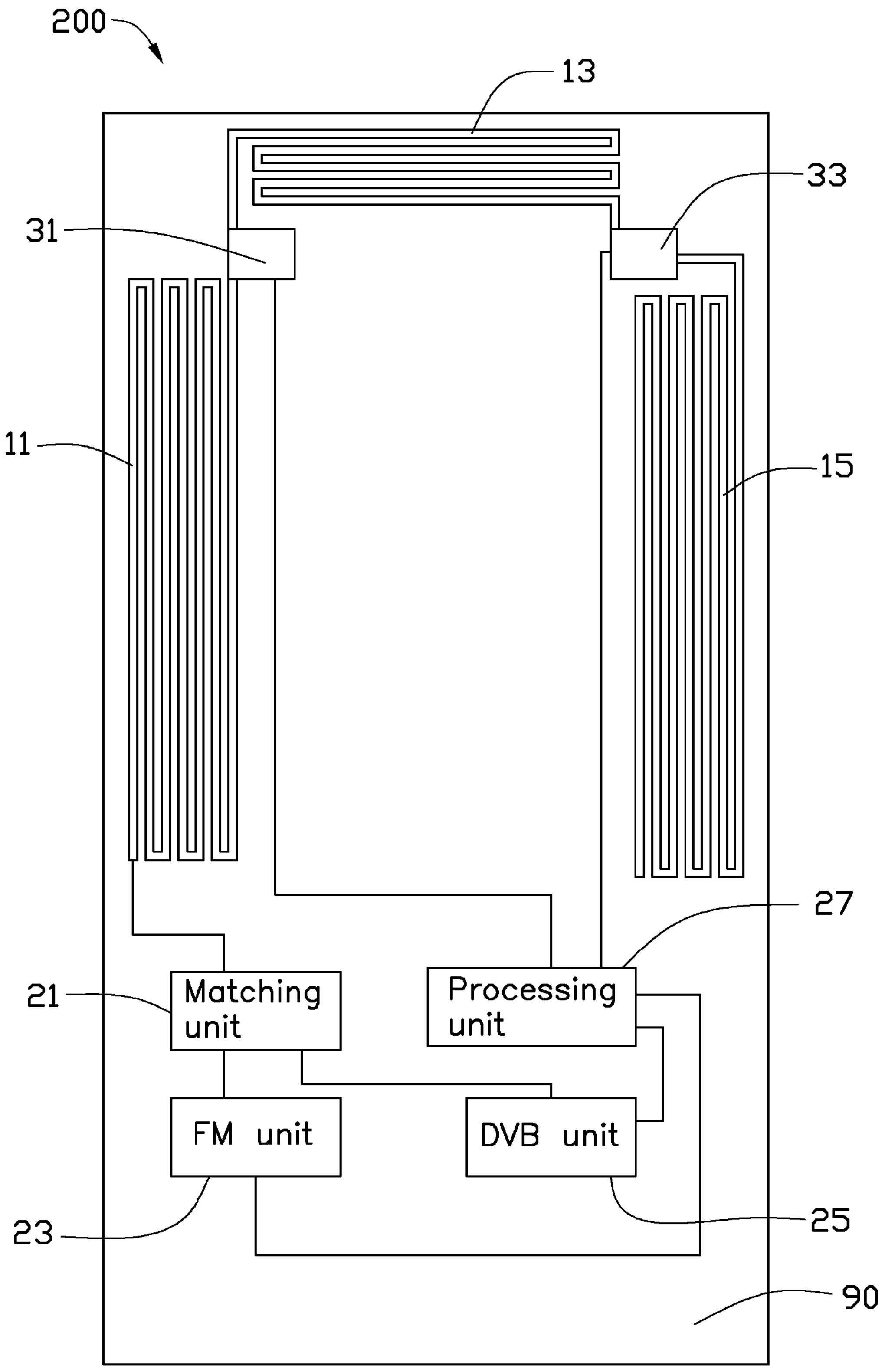
FIG. 2 is a schematic view of a wireless communication device having the multiband antenna shown in FIG. 1.

FIGS. 1-2 schematically show an exemplary embodiment of a multiband antenna 100 according to an exemplary embodiment, for use in a wireless communication device 200. Preferably, the wireless communication device 200 may be a mobile phone, PDA, etc. In use, the multiband antenna 100 is mounted on a main board 90 of the wireless communication device 200 and electrically connected to the main board 90.

The main board 90 can be a part of a printed circuit board (PCB) in the wireless communication device 200. The main board 90 includes a first edge 91, a second edge 92, a third edge 93 and a fourth edge 94.

Referring to FIG. 2, the multiband antenna 100 is a planar sheet, which can be made of conductive materials, such as coppers, copper alloys, etc. The multiband antenna 100 includes an antenna module 10 and a switch module 30. The switch module 30 is configured for controlling different portions of the antenna module 10 to electrical connect or disconnect with each other.

The antenna module 10 is configured for sending/receiving wireless signals and includes a first antenna member 11, a second antenna member 13, and a third antenna member 15. The first antenna member 11, the second antenna member 13, and the third antenna member 15 are located on the same surface of the main board 90. The first antenna member 11 is located adjacent to the first edge 91, and the second antenna member 13 is located adjacent to the second edge 92. The third antenna member 15 is located adjacent to the third edge 93.

The first antenna member 11 includes a plurality of first antenna units 111. Each first antenna unit 111 includes a first extension section 1111 and a first connection section 1113 perpendicularly connected to one end of the first extension section 1111.

Each first extension section 1111 is parallel to the first edge 91 and each first extension 1111 is equally spaced apart by the first connection section 1113. The first connection section 1113 of one first antenna unit 111 is perpendicularly connected to one end of the first extension section 1111 of another first antenna unit 111 in turn. Thus, each first connection section 1113 is located between the ends of two adjacent first extension sections 1111. The first antenna member 11 is electrically connected to the switch module 30 through one first extension section 1113. The first antenna member 11 is configured for receiving DVB-high signals.

The second antenna member 13 includes a plurality of second antenna units 131. Each second antenna unit 131 includes a second extension section 1311 and a second connection section 1313 perpendicularly connected to one end of the second extension section 1311. Each second extension section 1311 is parallel to the second edge 92 and equally spaced apart by the second connection section 1313. The second connection section 1313 of one second antenna unit 131 is perpendicularly connected to one end of the second extension section 1311 of another second antenna unit 131 in turn. Thus, each second connection section 1313 is located between the ends of two adjacent second extension sections 1311. When working together, the first antenna member 11 and the second antenna member 13 are configured for receiving DVB-low signals.

The third antenna member 11 includes a plurality of third antenna units 151. Each third antenna unit 151 includes a third extension section 1511 and a third connection section 1513 perpendicularly connected to one end of the third extension section 1511. Each third extension section 1511 is parallel to the third edge 93 and equally spaced apart by the third connection section 1513. The third connection section 1513 of one third antenna unit 151 is perpendicularly connected to one end of the third extension section 1511 of another third antenna unit 151 in turn. Thus, each third connection section 1513 is located between the ends of two adjacent third extension sections 1511. When working together, the first antenna member 11, the second antenna member 13, and the third antenna member 15 are configured for receiving FM signals.

The switch module 30 includes a first switch 31 and a second switch 33. The first switch 31 is electrically connected to the first antenna member 11 and the second antenna member 13. The first antenna member 11 is electrically connected and disconnected to the second antenna member 13 according to the state of the first switch 31 (open state/close state). The second switch 33 is electrically connected to the second antenna member 13 and the third antenna member 15. The second antenna member 13 is electrically connected and disconnected to the third antenna member 15 according to the state of the second switch 33 (open state/close state). Thus, the antenna module 10 can receive wireless signals of different frequency bands by operating the first switch 31 and the second switch 33 to have different combinations of antenna members working together.

The antenna module 10 receives DVB-high signals through the first antenna member 11 when the first switch 31 is opened and the second switch 33 is opened or closed. When the first switch 31 is closed, and the second switch 33 is opened, the first antenna member 11 and the second member 13 are electrically connected through the first switch 31, and the antenna module 10 receives DVB-low signals through the first antenna member 11 and the second antenna member 13. When the first switch 31 and the second switch 33 are both closed, FM signals are receivable by the multiband antenna 100 through the first antenna member 11, the second antenna member 13, and the third antenna member 15.

Also referring to FIG. 2, the wireless communication device 200 further includes a matching unit 21, a FM unit 23, a DVB unit 25, and a processing unit 27. The matching unit 21, the FM unit 23, the DVB unit 25, and the processing unit 27 are mounted on the main board 90.

One end of the first extension section 1111 adjacent to the first edge 91 is electrically connected to the matching unit 21, and the other end of the first extension 1111 is perpendicularly connected to the first connection section 1113. The matching unit 21 is configured for adjusting and eliminating resonance frequency point of the antenna module 10.

The FM unit 23 can be an existing FM chip and electrically connected to the matching unit 21. The FM unit 23 is configured for processing FM signals from the matching unit 21. For example, the FM unit 23 can filter clutter signals and transform the FM signals into digital signals.

The DVB unit 25 can be an existing DVB chip and is electrically connected to the matching unit 21. The DVB unit 25 is configured for processing DVB signals from the matching unit 21. For example, the DVB unit 25 can filter clutter signals and transform the DVB signals into digital signals.

The processing unit 27 can be combined with central processing unit (CPU). The processing unit 27 is electrically connected to the FM unit 23, the DVB unit 25, the first switch 31, and the second switch 33. The processing unit 27 is configured for controlling to open or close the first switch 31 and the second switch 33, so that the first antenna member 11, the second antenna member 13, and the third antenna member 15 can be selectively electrically connected to each other to receive different frequency signals. When the antenna module 10 receives the FM signals or the DVB signals, the processing unit 27 can invoke FM or DVB processing function of the wireless communication device 200 to play FM signals or DVB signals in the form of audio or video.

In the exemplary embodiment, a switch actuator or a control key can be set on the wireless communication device 200. The switch or the key is used to selectively receive FM signals or DVB signals. The processing unit 27 controls the first switch 31 and the switch 33 to open or close according to the operation of the switch or the key.

In use, when the switch or the key is actuated to selectively receive DVB-high signals, the processing unit 27 sends a corresponding control signal to the switch module 30 to open the first switch 31. Then the antenna module 10 receives DVB-signals through the first antenna member 11. The matching unit 21 receives the DVB-high signals from the first antenna member 11 and adjusts the DVB-high signals. The DVB unit 25 receives the DVB-high signals from the matching unit 21 and processes the DVB-high signals. The processing unit 27 receives the DVB-high signals from the DVB unit 25 and invokes the DVB processing function of the wireless communication device 200 to play the DVB-high signals in the form of video.

When the switch or the key is actuated to selectively receive DVB-low signals, the processing unit 27 sends a corresponding control signal to the switch module 30 to close the first switch 31 and open the second switch 33. Then the first antenna member 11 is in electrical series with the second antenna member 13 to receive DVB-low signals. The matching unit 21 receives the DVB-low signals from the antenna members 11 and 13, and adjusts the DVB-low signals. The DVB unit 25 receives the DVB-low signals from the matching unit 21 and processes the DVB-low signals. The processing unit 27 receives the DVB-low signals from the DVB unit 25 and invokes the DVB processing function of the wireless communication device 200 to play the DVB-high signals in the form of video.

Similarly, when the switch or the key is actuated to selectively receive FM signals, the processing unit 27 sends a corresponding control signal to the switch module 30 to close the first switch 31 and the second switch 33. Then the first antenna member 11, the second antenna member 13, and the third antenna member 15 are electrically connected in series to receive FM signals. The matching unit 21 receives the FM signals from the antenna members 11, 13 and 15, and adjusts the FM signals. The FM unit 23 receives the FM signals from the matching unit 21 and processes the FM signals. The processing unit 27 receives the FM signals and invokes the FM processing function of the wireless communication device 200 to play the FM signals in the form of audio.

In the multiband antenna 100 of the exemplary embodiment, the signal processing unit is not just limited to the FM unit 23 or the DVB unit 25, and the FM unit 23 and the DVB 25 may be replaced with other signal processing unit to receive corresponding wireless signals from the antenna module 10.

The multiband antenna 100 is installed in the wireless communication device 200 and does not occupy much space. The multiband antenna 100 has a simple structure and is small in size, which can further reduce the cost and miniaturize the size of the wireless communication device 200. Moreover, the antenna module 10 can selectively receive different wireless signals by opening or closing the switches of the switch module 30, thus the multiband antenna 100 is easy to operate.

It is to be understood, however, that even though numerous characteristics and advantages of the exemplary invention have been set forth in the foregoing description, together with details of the structure and function of the exemplary invention, the disclosure is illustrative only, and changes may be made in detail, especially in matters of shape, size, and arrangement of parts within the principles of exemplary invention to the full extent indicated by the broad general meaning of the terms in which the appended claims are expressed.

What is claimed is:

1. A multiband antenna, comprising:

an antenna module for communicating wireless signals, and comprising a first antenna member, a second antenna member, and a third antenna member; and a switch module electrically connected to the antenna module, wherein the switch module comprises a first switch and a second switch, the first switch is electrically connected between the first antenna member and the second antenna member, the second switch is electrically connected between the second antenna member and the third antenna member, the first antenna member and the second antenna member and the third antenna are electrically connected or disconnected with each other by operating the switch module to form different antenna structures for receiving different wireless signals, and when the first switch and the second switch are opened, the antenna module receives DVB-high signals through the first antenna member.

2. The multiband antenna as claimed in claim 1, wherein when the first switch is closed, and the second switch is opened, the first antenna member and the second antenna member are electrically connected through the first switch, the antenna module receives DVB-low signals through the first antenna member and the second antenna member.

3. The multiband antenna as claimed in claim 1, wherein when the first switch and the second switch are closed, the first antenna member, the second antenna member, and the third antenna member are electrically connected in series, and the antenna module receives FM signals through the first antenna member, the second antenna member, and the third antenna member.

4. The multiband antenna as claimed in claim 1, wherein the first antenna member, the second antenna member, and the third antenna member have rectangular sheet-shapes and are respective located on the edges of a main board; each antenna member comprises a plurality of antenna units, each antenna unit includes an extension section and a connection section perpendicularly connected to one end of the extension section.

5. The multiband antenna as claimed in claim 4, wherein each extension section is parallel with each other and equally spaced apart by the connection section; the connection section of one antenna unit is perpendicularly connected to one end of the extension section of another antenna, and each connection section is located between the ends of two adjacent extension sections.

6. A wireless communication device, comprising:
a main board;
a multiband antenna, comprising:
an antenna module for communicating different wireless signals comprising a first antenna member, a second antenna member, and a third antenna member, each antenna mounted on the main board; and
a switch module electrically connected to the antenna module;
a matching unit electrically connected to the first antenna member and configured for adjusting the wireless signals from the antenna module;
a first signal processing unit electrically connected to the matching unit, and configured for processing the first wireless signals from the matching unit;
a second signal processing unit electrically connected to the matching unit, and configured for processing the second wireless signals from the matching unit; and
a processing unit electrically connected to the first signal processing unit, the second signal processing unit, and the switch module; wherein the first antenna member, the second antenna member, and the third antenna member are electrically connected or disconnected by operating the switch module to receive different wireless signals, the wireless signals are played under the control of the processing unit.

7. The wireless communication device as claimed in claim 6, wherein the switch module comprises a first switch and a second switch, the first switch is electrically connected between the first antenna member and the second antenna member, and the second switch is electrically connected between the second antenna member and the third antenna member.

8. The wireless communication device as claimed in claim 7, wherein when the first and second switches are opened, the antenna module receives second wireless high signals through the first antenna member; when the first switch is closed, and the second switch is opened, the first antenna member and the second antenna member are electrically connected through the first switch, the antenna module receives second wireless low signals through the first antenna member and the second antenna member.

9. The wireless communication device as claimed in claim 7, wherein when the first switch and the second switch are closed, the first antenna member, the second antenna member, and the third antenna member are electrically connected in series, and the antenna module receives the first wireless signals through the first antenna member, the second antenna member, and the third antenna member.

10. The multiband antenna as claimed in claim 7, wherein the first antenna member, the second antenna member, and the third antenna member have rectangular sheet-shapes and are respective located on the edges of the main board; each antenna member comprises a plurality of antenna units, each antenna unit includes an extension section and a connection section perpendicularly connected to one end of the extension section.

11. The multiband antenna as claimed in claim 10, wherein each extension section is parallel with each other and equally spaced apart by the connection section; the connection section of one antenna unit is perpendicularly connected to one end of the extension section of another antenna, and each connection section is located between the ends of two adjacent extension sections.

12. A wireless communication device, comprising:
a main board;
a multiband antenna, comprising:
an antenna module for communicating different wireless signals comprising a first antenna member, a second antenna member, and a third antenna member, the antenna members mounted on the main board; and
a switch module electrically connected to the antenna module;
a matching unit electrically connected to the first antenna member and configured for adjusting the wireless signals from the antenna module;
a FM unit electrically connected to the matching unit, and configured for processing FM signals from the matching unit;
a DVB unit electrically connected to the matching unit, and configured for processing DVB signals from the matching unit; and
a processing unit electrically connected to the FM unit, the DVB unit, and the switch module; wherein the first antenna member, the second antenna member, and the third antenna member are electrically connected or disconnected by operating the switch module to receive different wireless signals, the wireless signals are played under the control of the processing unit.

13. The wireless communication device as claimed in claim 12, wherein the switch module comprises a first switch and a second switch, the first switch is electrically connected between the first antenna member and the second antenna member, and the second switch is electrically connected between the second antenna member and the third antenna member.

14. The wireless communication device as claimed in claim 12, wherein the switch module comprises a first switch and a second switch, the first switch is electrically connected between the first antenna member and the second antenna member, and the second switch is electrically connected between the second antenna member and the third antenna member.

15. The wireless communication device as claimed in claim 13, wherein when the first switch is opened, the antenna module receives DVB-high signals through the first antenna member; when the first switch is closed, and the second switch is opened, the first antenna member and the second antenna member are electrically connected through the first switch, the antenna module receives DVB-low signals through the first antenna member and the second antenna member.

16. The wireless communication device as claimed in claim 13, wherein when the first switch and the second switch are closed, the first antenna member, the second antenna member, and the third antenna member are electrically connected in series, and the antenna module receives FM signals through the first antenna member, the second antenna member, and the third antenna member.

17. The multiband antenna as claimed in claim 12, wherein the first antenna member, the second antenna member, and the third antenna member have rectangular sheet-shapes and are respective located on the edges of the main board; each antenna member comprises a plurality of antenna units, each antenna unit includes an extension section and a connection section perpendicularly connected to one end of the extension section.

18. The multiband antenna as claimed in claim 17, wherein each extension section is parallel with each other and equally spaced apart by the connection section; the connection section of one antenna unit is perpendicularly connected to one end of the extension section of another antenna, and each connection section is located between the ends of two adjacent extension sections.

* * * * *